United States Patent [19]

Beckr

[11] 3,804,995

[45] Apr. 16, 1974

[54] ARRANGEMENT FOR SUPPRESSING OVERSHOOT CAUSED BY LEVEL REGULATION IN CARRIER-FREQUENCY SYSTEMS

[75] Inventor: Leo Beckr, Affalterbach, Germany

[73] Assignee: International Standard Electric Corporation, New York, N.Y.

[22] Filed: Oct. 16, 1972

[21] Appl. No.: 298,052

[30] Foreign Application Priority Data

Oct. 18, 1971 Germany .......................... 2151794

[52] U.S. Cl. .............................. 179/170 A, 333/16

[51] Int. Cl. ............................................ H04m 7/10

[58] Field of Search........ 179/170 A, 170 C; 333/16

*Primary Examiner*—Thomas W. Brown

*Assistant Examiner*—Gerald Brigance

*Attorney, Agent, or Firm*—John T. O'Halloran; Menotti J. Lombardi, Jr.; Alfred C. Hill

[57] ABSTRACT

This relates to level regulation in a carrier frequency system with a plurality of repeaters in tandem. More particularly, the level regulator at the repeaters suppress overshoot (excessive regulation) by one or more regulators. The level regulator is disposed in each repeater of a pilot-controlled repeater chain. Suppression of overshoot is obtained by a gradient discriminator in each repeater which detects the rate of change of the pilot level deviation from a nominal level. If the rate of change exceeds a predetermined value, the level regulator is blocked.

10 Claims, 8 Drawing Figures

Figure 3:
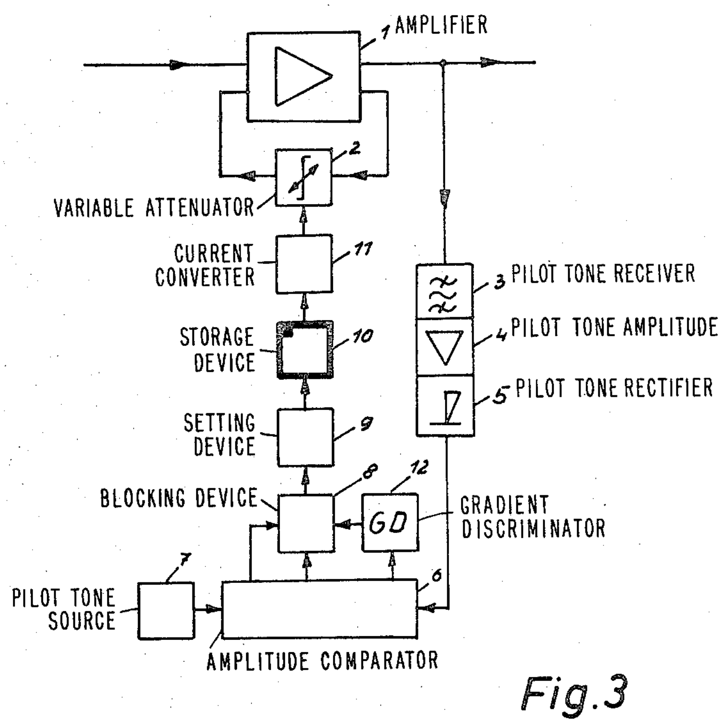

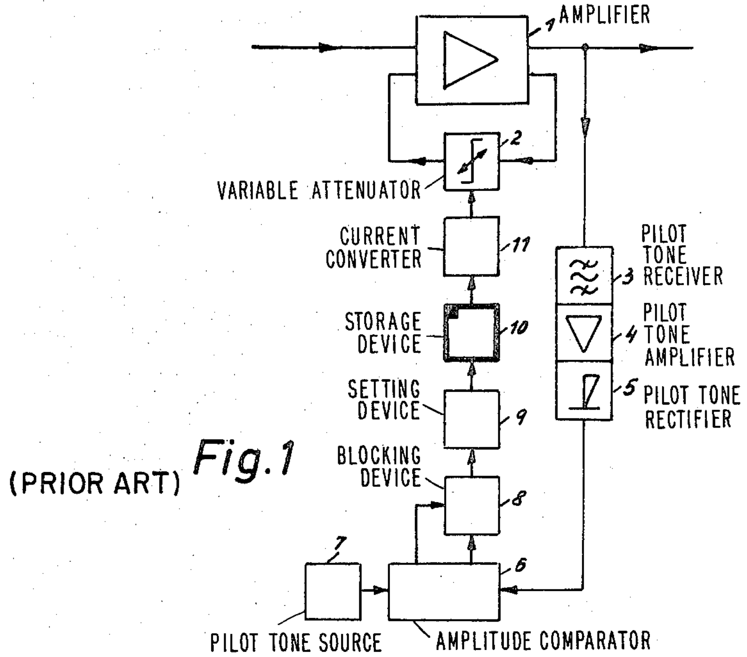
(PRIOR ART) Fig.1
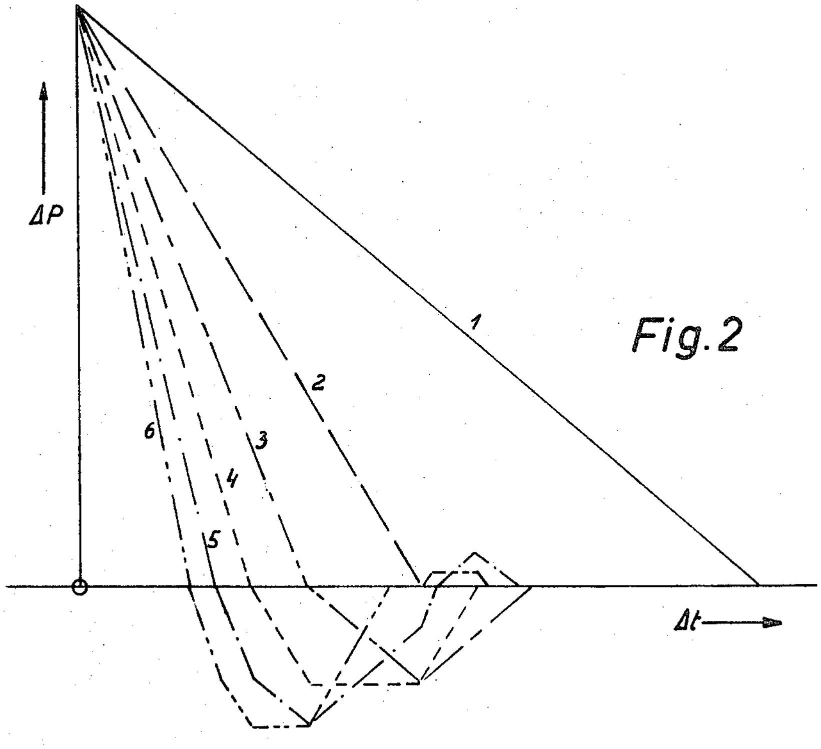
Fig.2

ARRANGEMENT FOR SUPPRESSING OVERSHOOT CAUSED BY LEVEL REGULATION IN CARRIER-FREQUENCY SYSTEMS

The present invention relates to an arrangement for suppressing overshoot caused by level regulation in a carrier-frequency system with a plurality of repeaters in tandem.

In the carrier art, it is common practice to also transmit from the transmitter station a constant-level pilot frequency, which, on the transmission path, is subject to all attenuation variations of the transmission path, such as cable or overhead line, and to all gain changes of the interposed repeaters. At the output of each repeater to be regulated, the level of this pilot frequency is compared with a nominal value, and from its deviation from this nominal value a controlled variable is derived, which is stored in a storage which, if the pilot frequency suddenly fails to arrive or in the case of a sudden power failure, maintains its latest status. With this storage value, which follows if the level of the pilot frequency slowly changes, the gain of the repeater is then readjusted to compensate for the level deviation of the pilot frequency. FIG. 1 shows a block diagram of such a pilot-level-controlled regulator for a repeater station. Designated 1 is the amplifier, and 2 is the variable attenuator inserted in its feedback loop and consisting in most cases of a resistance network with an indirectly heated thermistor as the final control element. 3, 4 and 5 constitute the pilot receiver, with 3 being the pilot filter, 4 the pilot amplifier, and 5 the rectifier, which supplies at its output a d.c. voltage analog value of the level of the pilot frequency. Designated 6 is a comparator, usually a differential amplifier, to one input of which is applied the d.c. voltage analog value of the level of the pilot frequency, while a d.c. voltage which is analogous to the nominal value of the level of the pilot frequency and is supplied from a source 7 is applied to the other input. The d.c. output signal of the comparator 6, which is analogous in magnitude and direction to the deviation of the pilot level from its nominal value, passes through a blocking device 8, which is normally "on", and reaches a setting device 9, which sets a storage 10. If the pilot level suddenly drops to values which cannot have been caused by changes in attenuation or gain but only by the failure of the pilot generator or of an amplifier or by a disconnection of the transmission line, the d.c. output signal of the comparator 6 will suddenly increase to abnormal values, too, and the blocking device 8 will be cut off, so that the actual status remains stored in the storage 10. A device 11 converts the status of the storage 10 into an analogous control current for the thermistor of the variable attenuator 2.

The just described basic structure of the regulating unit of a pilot-controlled repeater is common to all known storage-type regulators, whether they have a servomotor and a potentiometer as a storage or a step-by-step switching device and a step potentiometer or a pulse generator with digital storage or transfluxor or a storage capacitor with a field-effect transistor. Examples of all these types of regulators are known from the technical literature and from patent specifications, and their basic structure is not the subject matter of the present invention.

It is also known that the loss in transmission lines, such as cables or overhead lines, increases with increasing frequency. This requires that, as the number of channels of a carrier-frequency system increases, the spacing between two successive repeaters become smaller, the number of repeaters needed for a certain distance thus becoming greater. Even though some postal administrations nowadays equip part of the repeaters used in cable sections with a regulating system which is controlled by the ambient temperature and approximately regulates the variations in attenuation caused by influences of temperature, this leaves residual errors such that, after a certain number of such temperature-controlled repeaters, a repeater with pilot control must be inserted after all. This does not eliminate the need for a major number of pilot-controlled repeaters in tandem, either. In the case of slow attenuation changes such as are caused, for example, by variations in temperature, each pilot-controlled repeater follows the pilot level changes which are caused by influences on the path between it and the output of the preceding pilot-controlled repeater. The regulating system of the following repeater does not respond because the regulating speed of the regulators is higher than the rate of such level changes whereby the pilot level at its output is kept constant.

The fact is different with level transients. They may be caused by a failure or a short interruption of the supply voltage, by defects in a component in the transmission chain, by the replacement of parts of the transmission chain or of parts of the line equipment, etc. Since the pilot-controlled repeater immediately following the station causing the level transient cannot immediately follow this fast change, the regulators of the subsequent repeaters will respond, too. After each further repeater, this simultaneous regulation increases the rate of change in pilot level. Since, as a result, the respective preceding regulator continues to operate when the next one has already reached the nominal value of the pilot level, overshoot is produced.

FIG. 2 shows the level change $\Delta$ P, measured in decibels or nepers at the outputs of six successive repeaters at the occurence of such a level transient as a function of the time $\Delta t$, from the beginning of this transient.

These conditions are described in E. Koch's article "Uber die Pegelregulierung langer Fernleitungen," FTZ (1951), No. 8, pp. 352 – 361. As a remedy, the article proposes staggering the response of the series-connected, controlled repeaters as to time, so that the repeater right behind the station causing the transient has already regulated the disturbance before the next one responds. This, however, results in intolerably long times of regulation, particularly for the repeaters toward the end of the chain. The German printed applications Pat. Nos. 1,261,890 1,811,055 therefore propose feeding in the pilot frequency anew after each repeater section, so that only the repeater following the station causing the variation in attenuation can perform the regulation, while the following ones always remain at rest. If one and the same frequency is used for the pilots, the picking-up, blocking, and feeding-in again of the pilots results in an intolerable investment in filters. If the individual pilots are shifted in frequency by a certain frequency $\Delta f$, requirements are imposed on the necessary frequency bandwidth which are practically impossible to fulfill, or the pickup and combining filters must have such narrow bandwidths that only very costly crystal filters could be employed. To this must in any case be added the necessary great amount of components and the power requirement for generating the freconstant-frequency and constant-level pilot in each repeater, it having to be taken into consideration that the reception of the incoming signal, i.e., also of the incoming pilot and any auxiliary frequencies, may fail altogether.

Thus, however ideal the last-mentioned possibility may appear at first sight, the necessary expenditure is still so high that its practical application is out of the question. It is therefore the object of the present invention to provide an arrangement for suppressing such overshoot which needs no additional filtering devices and permits the usual regulator arrangements for repeaters to be retained, while requiring a relatively low additional investment in circuitry. The attainment of this object is based on the consideration that a nearly optimum regulation behavior can be achieved if during the regulation process only the first or the first and the second repeater behind the place of disturbance perform regulation, while all other repeaters remain at rest.

According to the invention, in a carrier-frequency system with a plurality of repeaters in tandem in which the transmitter also transmits a constant-level pilot frequency, its level being compared at the output of each repeater to be regulated with a nominal value, a controlled variable being derived from the deviation from the nominal value, said controlled variable being stored, and said stored value being used to readjust the gain of the repeater in order to compensate for the deviations from the nominal value, the above-mentioned object is attained by additionally supervising the deviation from the nominal value for its rate of change and, if a predetermined value of the rate of change is exceeded in the direction of deviation compensation, interrupting the readjustment of those repeaters in which the rate of change exceeds said predetermined value.

A further feature of the invention is characterized in that the supervision of the rate of change in the deviation of the pilot level from its nominal value is performed with a gradient discriminator, that said gradient discriminator delivers at its output a control signal if the rate of change in the deviation at its input exceeds a value greater than the rate of change caused by the regulation of a repeater but smaller than the rate of change caused by the simultaneous regulation of two repeaters, and that said control signal blocks a blocking device, thus bringing the regulators of the repeaters involved to rest.

A particularly advantageous alternative thereto is characterized in that the supervision of the rate of change in the deviation of the pilot level from its nominal value is performed with a gradient discriminator, that, after a threshold of response is exceeded which is greater than the rate of change caused by the simultaneous regulation of two repeaters but smaller than that caused by the simultaneous regulation of three repeaters, said gradient discriminator delivers at its output a control signal until the rate of change has reached a "drop" threshold which is smaller than the rate of change caused by the simultaneous regulation of two repeaters but greater than that caused by the regulation of only one repeater, and that said control signal blocks a blocking device, thus bringing the regulators of the repeaters involved to rest.

In the figures already described in connection with the prior art,

FIG. 1 is a block diagram showing the basic layout of a repeater with pilot-controlled level regulation and storage, and FIG. 2 is a diagram illustrating the level change at the output of six series-connected, pilot-controlled repeaters as a function of time, starting with the occurence of a pilot-level transient at the input of this chain.

The invention will now be described in detail with the aid of the following figures, of which:

FIG. 3 is a block diagram showing the basic layout of a repeater with pilot-controlled level regulation and storage and containing the inventive measures for the suppression of overshoot, and FIGS. 4 to 8 show some possibilities of realizing the gradient discriminator necessary for the arrangement in accordance with the invention.

The basic layout of a repeater with pilot-controlled level regulation and storage as shown in the block diagram of FIG. 3 corresponds to the layout shown in the block diagram of FIG. 1 with the exception of the gradient discriminator 12; therefore, like units are designated by like reference characters. This gradient discriminator 12, whose various possibilities of realization will be described later, determines the rate of change $d(\Delta P)/dt$ in the pilot level deviation from the nominal value, i.e. the gradient of the change in pilot level deviation, at the output of each regulated repeater. As can be seen in FIG. 2, this shows how many regulators of the repeater chain operate simultaneously. If the rate of change corresponds to the line 1, the regulator of only one repeater operates; if it corresponds to the line 2, two repeaters perform regulation, etc. Since it can be assumed that the structure of all regulators used in a repeater chain is alike, i.e., since their regulating speeds differ only by the permissible component variations, particularly by the variations of the thermistors, the rate of change which, if 1 . . . 3 different regulators of this chain respond simultaneously, results at the output of the last repeater just performing regulation scatters only so that there are clearly recognizable intervals between the rates of change which are caused by the simultaneous regulation of 1 or 2 or 3 regulators and are capable of being evaluated. Thus, if the gradient discriminator 12 has a threshold which lies between the rate of change used by the regulation of one repeater and that caused by the simultaneous regulation of two repeaters, and if this gradient discriminator is designed so that a control signal is developed at its output if this threshold is exceeded, this control signal can be used to block the blocking device 8, so that the regulators of all repeaters, except the first one following the defective station, are brought to rest. In the second, i.e., next, regulator, this stoppage causes the rate of change to again drop below the threshold, so that the blocking is canceled and the regulator starts to operate again, and this cycle repeats itself. Hence it follows that this second regulator then operates at a reduced, i.e., at one-half the, regulating speed. As a result, however, the rate of change at the outputs of all following regulated repeaters exceeds the threshold, so that the regulators of these repeaters remain out of operation.

As can also be seen in FIG. 2, however, it would be ideal if two regulators with identical regulating speed regulated the disturbance simultaneously because the disturbance would then be regulated in the shortest possible time if overshoot is to be avoided. This can be achieved by choosing the threshold of response of the gradient discriminator 12 to lie at a rate of change between line 3 and line 2. If, however, the gradient discriminator has a "drop" threshold corresponding to a rate of change between lines 2 and 1, the regulators 1 and 2 are not influenced because at the outputs of the repeaters associated with them the rate of level change can never exceed the value given by line 2. The third regulator, like the following ones, will respond for a short time, but then the threshold of response of the gradient discriminators is exceeded, and these regulators are brought to rest. Until the deviation "zero" is reached through the operation of the two first regulators, the rate of change does not drop below the "drop" threshold for the 3rd and following regulators, either, and the latter are not released; after that, since there is no overshoot, there no longer is any level deviation to restart them.

A number of possible solutions for the gradient discriminator 12 will now be described with reference to FIGS. 4 to 8. It is assumed that both sudden level decreases and sudden level increases may occur. Level decreases occur, for example, in the case of component failures, if a link is put into operation again after a power failure, etc., while level increases may be caused by the replacement of a pilot generator and on overhead lines. Hence, the arrangement in accordance with the invention is to operate after both sudden positive and sudden negative deviations of the signal developed at the output of the comparator 6 if, during the regulation beginning after the sudden change, the rate of change in this output signal exceeds a predetermined value.

Figure 4:
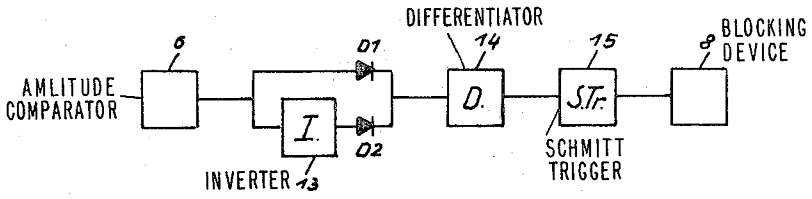

In FIG. 4, the output signal of the comparator 6 is applied directly through a diode D1 and, after having been inverted in an inverter stage 13, through a diode D2 to the input of a differentiator 14, whose output delivers d.c. voltages the amplitude of which depends on the rate of change in the output signal of the comparator 6 and, consequently, on the rate of pilot level change. The amplitude of these d.c. voltages is supervised by a Schmitt trigger 15 whose threshold of response is chosen to be analogous to the rate of change at which the associated regulator is to be brought to rest. The output signal of the Schmitt trigger 15 then blocks the blocking device 8. If this gradient discriminator is to have a "drop" threshold lower than the threshold of response, use is made, for example, of Schmitt triggers with different response and "drop" thresholds, which are commercially available as integrated circuits.

Figure 5:
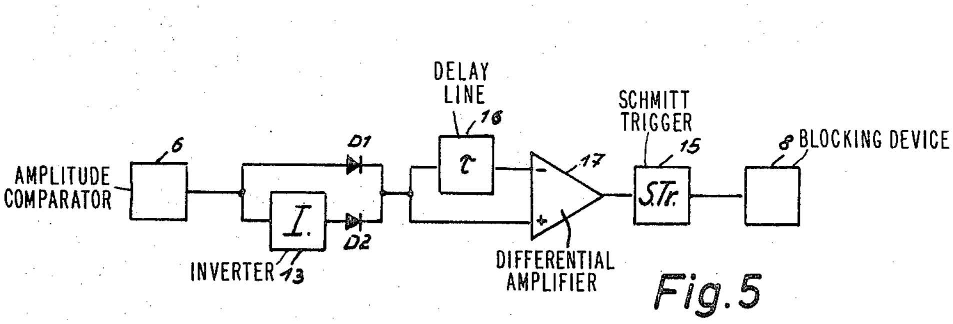

In FIG. 5, the input circuit, comprising diodes D1 and D2 and inverter stage 13, corresponds in its structure and operation to that of FIG. 4. Its output signal is applied directly to one input of a differential amplifier 17 and, after having been delayed in a delay line 16, to the other input of this amplifier; if there is no change or a slow change in the input signal, the differential amplifier delivers the output signal "zero"; as the rate of change increases, it delivers, due to the delay line 16, a d.c. signal whose level rises proportionally and which is in turn supervised by a Schmitt trigger 15 controlling the blocking device 8, as described with reference to FIG. 4.

Figure 6:
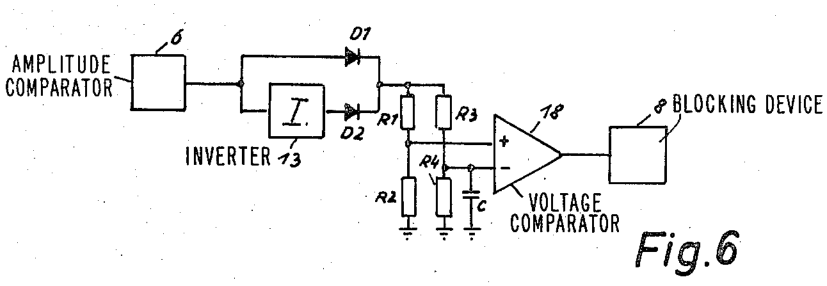

FIG. 6 shows a simplified modification of the circuit of FIG. 5. Here, the differential amplifier is a voltage comparator of, e.g., the μA 710 type, which is a widely used integrated circuit. Of the two voltage dividers R1, R2 and R3, R4, C, the first supplies an undelayed signal and the second a delayed signal. If the threshold of response of the comparator is exceeded due to unequal voltage division in proportion to the rate of change, the comparator changes over and delivers at its output a blocking signal for the blocking device 8. Different response and "drop" thresholds cannot be achieved here, at least not with the commercially available integrated circuits.

Figure 7:
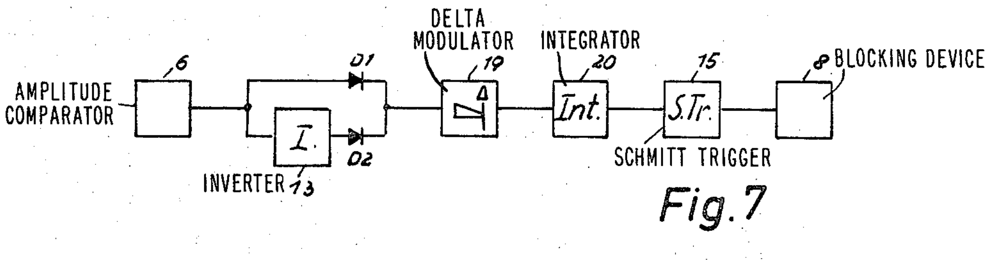

FIG. 7 shows another realization of the gradient discriminator 12. Here, too, the input and output circuits correspond to those of FIGS. 4 and 5. The output signal of the input circuit is applied to a delta modulator 19, the output of which delivers a pulse train whose repetition frequency is proportional to the rate of change and whose polarity corresponds to the rate of change. This pulse train is integrated in an integrator 20, at whose output is thus developed a d.c. voltage which is proportional to the rate of input signal change. The following Schmitt trigger 15 then evaluates only one polarity of the output voltage of the integrator 20, and its output signal controls the blocking device 8.

Figure 8:
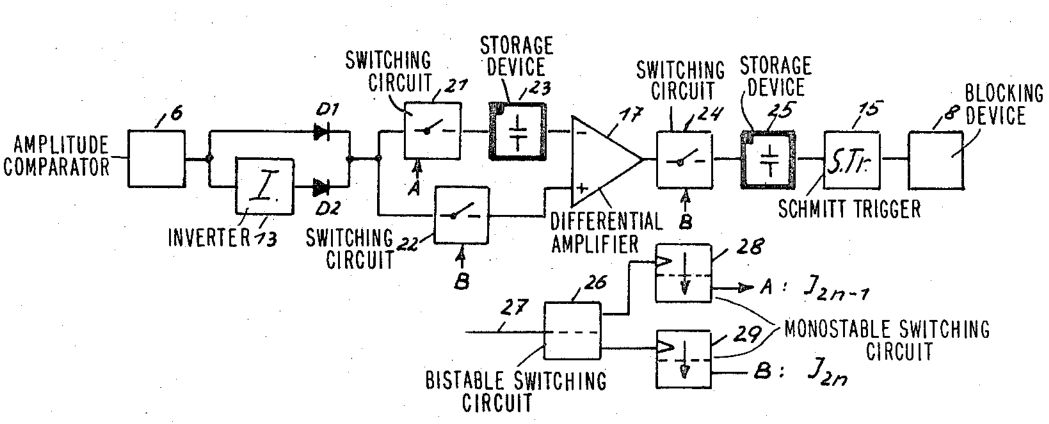

FIG. 8 shows a realization of the gradient discriminator 12 which can be used to advantage in regulators operating with a clock frequency of their own, such as regulators with step-by-step switching devices, digital counting chains or transfluxor storages. Here, too, the input and output circuits correspond to those of FIGS. 4, 5 and 7. The clock frequency of the regulator is applied to the input 27 of a bistable switching circuit 26, at one of whose outputs a logic "1" is developed after all odd-numbered clock pulses, while at the other output a logic "1" is developed after all even-numbered pulses. The leading changeover edge of the output signal triggers monostable switching circuits 28 and 29, respectively, so that one obtains two pulse trains $J_{2n-1}$ and $J_{2n}$, respectively, shifted with respect to one another by the clock pulse cycle. By means of a switching circuit 21, the instantaneous value of the input signal is entered into a capacitor storage 23, which is connected to one input of a differential amplifier 17 if a pulse occurs in the pulse train $J_{2n-1}$. At the following pulse of the pulse train $J_{2n}$, the switching circuit 22 is turned on, and the input signal is applied directly to the other input. At the same time, the output signal of the differential amplifier 17, which, during the turning-on of the switching circuit 22 following the buildup of the differential amplifier 17, is proportional to the rate of input signal change, is applied, by means of a switching circuit 24, which is also controlled by the pulses of the pulse train $J_{2n}$, to a capacitor storage 25, whose charge is supervised, via the voltage, by a Schmitt trigger 15, which controls the blocking device 8. The pulse widths of the pulses delivered by the monostable switching circuit 29 must be sufficiently small compared with the clock pulse cycle, but long enough to insure that during this time the differential amplifier 17 has built up and the final value of its output signal is entered into the capacitor storage 25. A corresponding requirement is imposed on the monostable switching circuit 28 regarding the entry into the capacitor storage 23.

FIGS. 4 to 8 give only some possibilities of realization; many variations are possible. In FIG. 7, for example, the integrator 20 may be replaced by an overflow counter which is reset at 0 at the clock rate and delivers a signal whenever its final count prior to the new clock pulse is reached. This signal is then stored during a clock pulse and controls the blocking device 8. A "drop" threshold cannot be achieved therewith.

I claim:

1. An arrangement for suppressing overshoot caused by excessive level regulation in a carrier-frequency system having a plurality of repeaters connected in tandem comprising:

first means to propagate a constant-level pilot frequency through said repeaters;

each of said repeaters to be level regulated including a local source of said pilot frequency having a given nominal level, an amplitude controllable amplifier to receive said pilot frequency from said first means, second means coupled to said local source and the output of said amplifier to compare the levels of said pilot frequency from the output of said amplifier and said local source and produce a first control signal proportional to the deviation of the level of said pilot frequency at the output of said amplifier from said given nominal value, third means coupled between said second means and said amplifier to couple said first control signal to said amplifier for level regulation thereof to compensate for said deviation from said given nominal level, and fourth means coupled to said second means and said third means to detect the rate of change of said first control signal, to produce a second control signal when said rate of change exceeds at least a first predetermined value and to couple said second control signal to said third means to interrupt said level regulation provided by said first control signal.

2. An arrangement according to claim 1, wherein said third means includes a storage means for said first control signal, and a blocking means coupled between said second means and said storage means, said blocking means being responsive to said second control signal to prevent said first control signal from being coupled to said storage means.

3. An arrangement according to claim 2, wherein said fourth means includes a gradient discriminator having at least a first predetermined threshold equal to said predetermined value to determine when said second control signal is produced.

4. An arrangement according to claim 3, wherein said first predetermined threshold is a level equal to the value of a rate of change of said first control signal caused by level regulation of one of said repeaters but less than the value of a rate of change of siad first control signal caused by the simultaneous level regulation of two of said repeaters.

5. An arrangement according to claim 3, wherein said first predetermined threshold is a level equal to the value of a rate of change of said first control signal caused by the simultaneous level regulation of two of said repeaters but less than the value of rate of change of said first control signal caused by the simultaneous level regulation of three of said repeaters, and said gradient discriminator produces said second control signal when said first predetermined threshold is exceeded and continues to produce said second control signal until a second predetermined threshold is reached, said second predetermined threshold being less than said first predetermined threshold.

6. An arrangement according to claim 5, wherein said second predetermined threshold is a level equal to less than the value of a rate of change of said first control signal caused by the simultaneous level regulation of two of said repeaters but greater than the value of a rate of change of said first control signal caused by the level regulation of only one of said repeaters.

7. An arrangement according to claim 1, wherein said fourth means includes a gradient discriminator having at least a first predetermined threshold equal to said predetermined value to determine when said second control signal is produced.

8. An arrangement according to claim 7, wherein said first predetermined threshold is a level equal to the value of a rate of change of said first control signal caused by level regulation of one of said repeaters but less than the value of a rate of change of said first control signal caused by the simultaneous level regulation of two of said repeaters.

9. An arrangement according to claim 7, wherein said first predetermined threshold is a level equal to the value of a rate of change of said first control signal caused by the simultaneous level regulation of two of said repeaters but less than the value of a rate of change of said first control signal caused by the simultaneous level regulation of three of said repeaters, and said gradient discriminator produces said second control signal when said first predetermined threshold is exceeded and continues to produce said second control signal until a second predetermined threshold is reached, said second predetermined threshold being less than said first predetermined threshold.

10. An arrangement according to claim 9, wherein said second predetermined threshold is a level equal to less than the value of a rate of change of said first control signal caused by the simultaneous level regulation of two of said repeaters but greater than the value of a rate of change of said first control signal caused by the level regulation of only one of said repeaters.

* * * * *